Nov. 7, 1967
R. S. TURNER
3,351,310
FLOWER HOLDER FOR CASKETS
Filed May 12, 1965
3 Sheets-Sheet 1
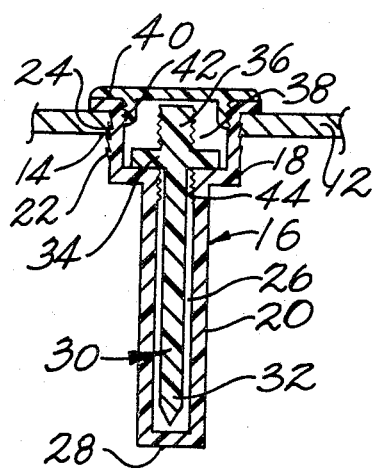
FIG. 1
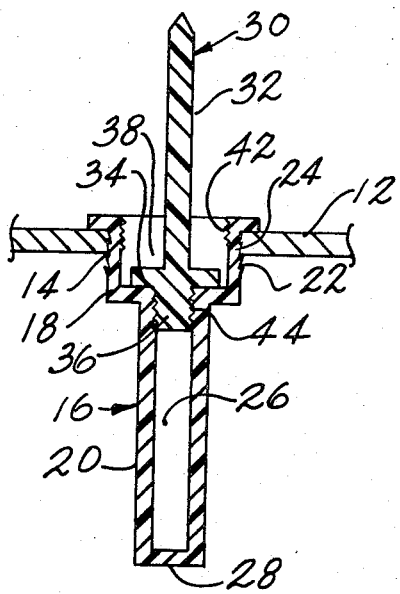
FIG. 2
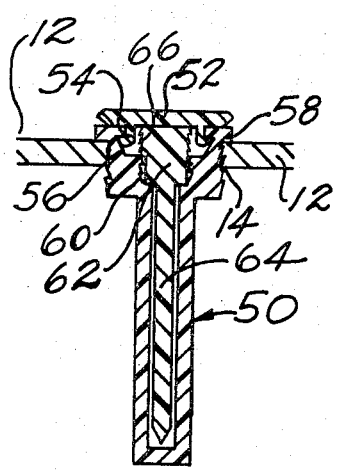
FIG. 3
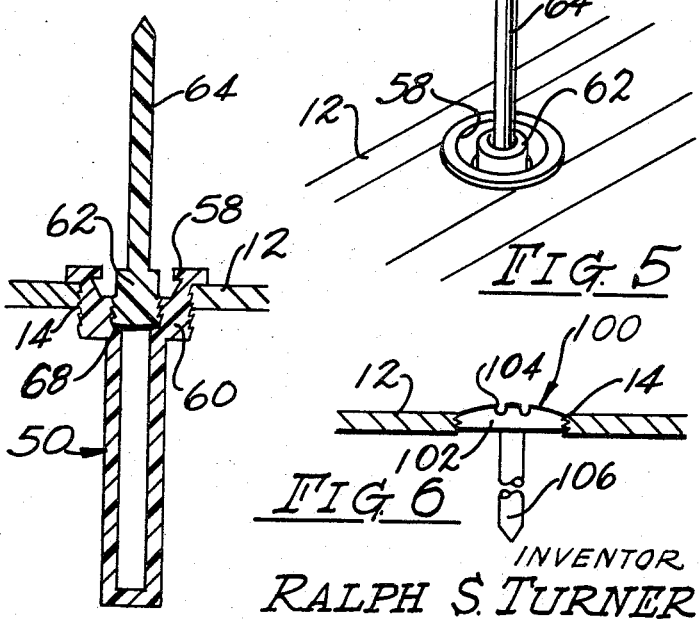
FIG. 4
FIG. 5
FIG. 6
INVENTOR
RALPH S. TURNER
BY
ATTORNEY

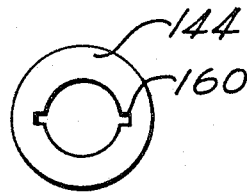
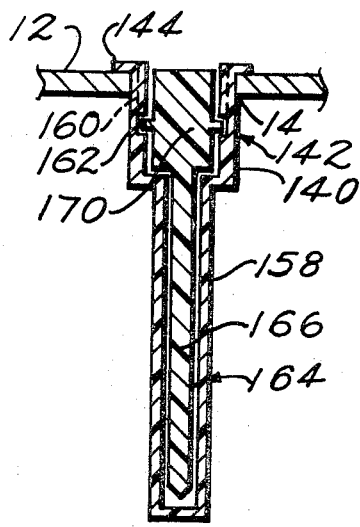
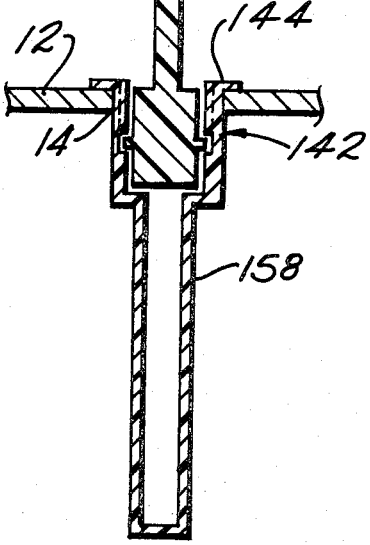
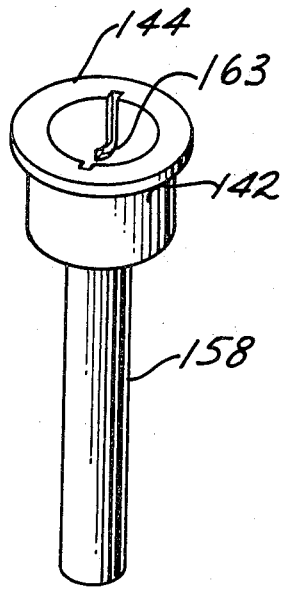
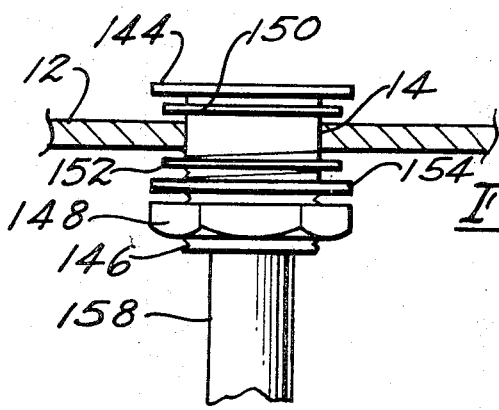

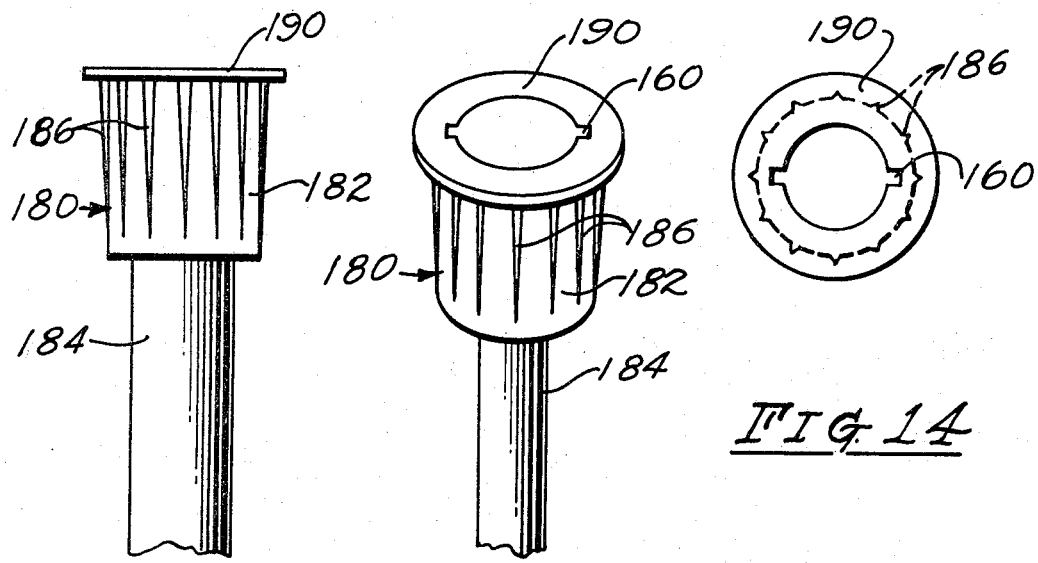
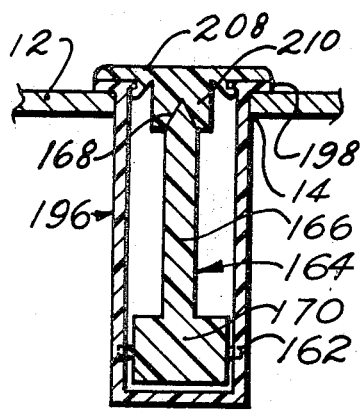
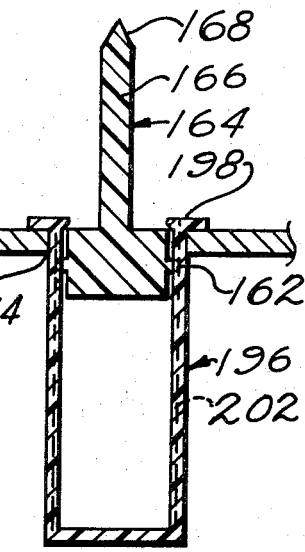
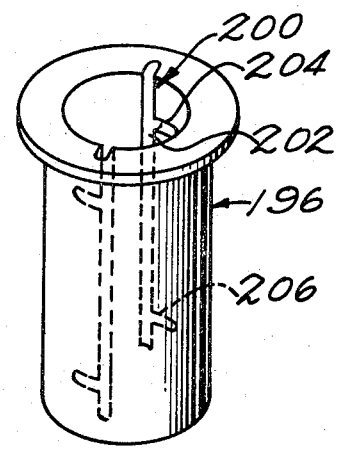

United States Patent Office 3,351,310
Patented Nov. 7, 1967

3,351,310
FLOWER HOLDER FOR CASKETS
Ralph S. Turner, P.O. Box 30, 2773 N. Decatur Road,
Decatur, Ga. 30030
Filed May 12, 1965, Ser. No. 455,072
16 Claims. (Cl. 248—27.8)

ABSTRACT OF THE DISCLOSURE

A flower holder normally concealed in a casket lid and including a normally recessed but extensible flower holder member concealed in the casket but placed into operative position during the time when flowers and wreaths are placed on the casket to prevent them from falling.

---

It is customary at funeral services to place wreaths and flower arrangements on top of the casket which presents a problem because there is a tendency for the larger wreaths to fall off and to damage the flowers and also to delay the services. In the prior art there are a number of detachable flower holders, some of which work magnetically, that are placed on top of the casket. However, these very often become lost in transit and are not always available when needed. There is a demand for an inexpensive flower holder which is normally concealed in a casket but which can be placed into operative condition when needed and then easily removed and concealed or disposed thereof thereafter.

Generally described, without restriction on the scope of my invention as defined in the appended claims, the present device presents a concealed flower holder which is normally concealed inside of a housing on one side of the casket lid. The housing for the flower holder is preferably built into the casket lid in the form of cylindrical sleeve which is welded or screwed into an opening in the lid and sealed in a water tight condition. Inside of this housing in inverted position is the flower holder which is an elongated shaft with a pointed end preferably made from light weight metal, plastic or the like. One end of the elongated flower holder may be threaded to match with threads placed in the recessed portion of the housing so that when the flower holder is removed from the housing and inverted into extended position, it is screwed in place thereby having sufficient stability and strength to hold a heavy flower arrangement. Normally, a removable and replaceable cap covers the opening that leads to the inside of the housing and this cap may be removed and replaced after the need for the flower holder has passed.

A primary object of this invention is to provide a concealed flower holder that is inside of a concealed housing on the casket lid.

A further object of this invention is to provide a flower holder which in normal inverted condition is placed into a housing in the lid that is covered by a cap and then in extended position is inverted and fastened therein.

Another object of this invention is to provide a flower holder which is easily removed from the casket lid and placed into operative position and which is thereafter replaceable or may be discarded.

Other and further objects and advantages of my invention will become apparent upon reading the following specification taken in conjunction with the accompanying drawings, in which:

FIG. 1 is a cross-sectional view of one embodiment of the present invention forming a part of the casket lid.

FIG. 2 is a cross-sectional view the same as FIG. 1 but with the flower holder inverted and screwed into operative position.

FIG. 3 is a cross-sectional view through a casket lid showing an alternative form of construction of the present invention.

FIG. 4 is a view similar to that in FIG. 3 and with the flower holder inverted into operative position and forced in place.

FIG. 5 is a perspective view of the device shown in FIGS. 3 and 4.

FIG. 6 is a cross-sectional view of still another modified form of the present invention.

FIG. 7 is a cross-sectional view taken substantially along a vertical plane through still another modified form of the invention which utilizes a "bayonet" fitting.

FIG. 8 is a cross-sectional view taken along the same plane and the same as FIG. 7 but with the flower holder in extended position.

FIG. 9 is an enlarged side elevation view of the external housing and fittings for the holder shown in FIG. 7 and with parts in section and other parts broken away.

FIG. 10 is a perspective view of the external holder shown in FIG. 7.

FIG. 11 is a top plan view of the device shown in FIG. 7.

FIG. 12 is a partial side elevation view of the external housing constructed for wooden construction.

FIG. 13 is a perspective view of the external housing and top shown in FIG. 12.

FIG. 14 is a top plan view of the device shown in FIGS. 12 and 13.

FIG. 15 is a vertical cross-section view taken through a modified form of the invention.

FIG. 16 is a vertical cross-section substantially the same as FIG. 15 but with the flower holder extended.

FIG. 17 is a perspective view of the top of the housing shown in FIGS. 15 and 16.

Referring initially to the embodiments shown in FIGS. 1 and 2, and thence to the other embodiments of the invention, the present device, except for the flower holder itself, is a permanent and fixed part of the casket lid which forms the top portion of a casket and the construction of which is well known and does not per se form part of this invention. The casket lid is usually constructed from metal, fiber glass or the like and is designated herein generally by reference numeral 12. An opening 14 located near one side of the casket lid 12 is closed by means of a flower holder housing 16 consisting of an upper cylindrical portion 18 and a lower and longer cylindrical portion 20. Upper portion 18 is provided with serrations 22 on the outer periphery thereof which engage with similar serrations 24 in the opening 14 whereby the cylindrical portion 18 is fastened in place through the force and pressure of pushing it into the opening 14 to lock the serrations 22 and 24. The inside of cylindrical portion 18 is hollow and leads to a similar hollow portion 26 inside of cylindrical portion 20. The bottom of cylindrical member 20 is closed by a bottom member 28. The flower holder is designated generally and overall by reference numeral 30 and comprises an elongated shaft 32 integrally connected to a collar 34 having a cylindrical screw threaded portion 36 extending therefrom.

The opening 38 in cylindrical housing 18 is normally closed by means of a threaded cap 40 held in place by the threads 42.

To place the floral holder 30 in operative position, cap 40 is removed by hand, the shaft 32 is inverted from the position shown in FIG. 1 to the position shown in FIG. 2 and a screw threaded portion on 36 is screwed into the threaded portion 44 formed inside of the cylindrical portion 20.

In the position shown in FIG. 2, a large wreath may be placed on the protruding shaft 32 and is firmly held on top of the casket lid 12. After the need for the flowers has passed, the entire floral holder 30 may be removed and replaced in its concealed and recessed position shown in FIG. 1 or may be discarded or retained for future use.

In the modified embodiment shown in FIGS. 3 and 4, a similar housing designated generally at 50 is mounted on the casket lid 12 and rather than the screw threaded cap arrangement 40 shown in FIG. 1, the cap 52 is provided with spaced and projecting lugs 54 having flanges 56 thereon which fit inside of a circular flange 58 formed on the upper cylindrical portion 60 of the member 50. The upper end 62 on shaft 64 is smaller near the shaft 64 than the one in FIG. 1 and is serrated at 66 to bite screw into an internal portion 68 which may be serrated on the inside of the cylindrical portion 60. End 62 and/or portion 68 may be screw threaded if desired.

In the operation of the device shown in FIGS. 3 and 4, the entire flower holder is removed and the shaft 64 inverted to the position shown in FIG. 4 and held in place through the engagement of serrations 66 in the internal portions 68.

In the modified form shown in FIG. 6, the casket lid 12 is provided with a threaded opening 14. The flower holder is a one piece device designated generally by the reference numeral 100 and comprises a circular cap 102 having finger engagement portions 104 on the top thereof and being convex across the upper surface to provide a smooth, neat contour. Cap 102 is intricately formed with the full holder shaft 106 extending therefrom down into the side of the casket lid.

In the operation of the device shown in FIG. 6, the entire device 100 is removed by unscrewing same through the use of the manipulation of the fingers in the finger gripper portions 104 and then the device is inverted, as shown in the dotted lines, and again screwed in place in the inverted condition and used to hold flowers until the need has passed at which time the device is again returned to its inverted position shown in the full lines of FIG. 6 and the opening 14 in the casket lid 12 is tightly sealed.

In the construction of the device shown in FIGS. 7 through 9, the casket lid 12 is provided with the same opening 14 as in the previous embodiments and which opening is normally closed by means of an external housing 140 which is cylindrical at the top portion 142 and as seen in FIG. 9 has a top flange 144 and an external threaded portion 146 to which is fitted a pressure nut 148 that pressure tightens against an upper neoprene washer 150 on the top of the casket lid 12 and an internal or inner neoprene washer 152 on the inside of the lid 12 and against which is fitted a plastic washer member 154. All of the circular members, the neoprene washers 150, 152 and the plastic washer 154 are tightened in place by the nut 148. This securely seals the inside of the casket and affixes the housing 140 in place. The top portion 142 of housing 140 is enlarged as compared with the longer and smaller portion 158 at the bottom which receives the holder. The cylindrical portion 142 is hollow on the inside and is provided with vertical, internal peripheral slots 160 forming part of a conventional bayonet fitting and which lead to at least partial circular slots 163 down inside of the internal portion of the enlarged member 142. The flower holder designated generally at 164 has the usual elongated blade 166 with point 168 and has a cylindrical piece 170 which is provided with the bayonet lugs 172 on each side.

Normally the holder 164 is retracted in the position shown in FIG. 7 down inside of the elongated housing portion 158. However, when it is desired to use the holder, it is removed from the housing 140 and placed in extended position as shown in FIG. 8. In both positions, the lugs 172 are fitted down into the corresponding and complementary slots 160 until they reach the circular grooves 163 at which time a slight twist or turn of the entire member 164 securely locks the holder 164 in place.

A cap (not shown in FIGS. 7 through 10) of the sort shown in the previous embodiments may be fitted to the top of the housing 140.

The devices and constructions shown in FIGS. 12 through 14, inclusive, pertain and relate to wooden casket construction since there are many types of wood caskets being used some of which are very expensive walnut, fruitwoods and other types of fine caskets. The internal portion of the device shown in FIGS. 12 through 14, inclusive, is the same as that shown in the modified form of the invention shown in FIGS. 7 through 11, inclusive. However, the outside of the housing and holder designated generally by the reference numeral 180 includes the usual enlarged portion 182 at the top and the longer but smaller portion 184 at the bottom which receives the elongated blade-like member 166, and the upper portion 182 on the external, cylindrical periphery is provided with a plurality of elongated substantially vertical and tapered friction members 186 spaced around the periphery of the outside of member 182 and which may be constructed from metal, plastic or other material and may be molded in one operation with the cylindrical portion 182 or may be provided separately as metal attachments. Since the circumference of the holder 180 around the outside of the tops of the members 186 is larger than at the bottom, and since there is at the top the usual flanged member 190, the holder 180 may be positioned in the opening 14 much in the manner of the previous embodiments and then driven into the wooden lid 12 forcing the members 186 against the internal edge of the wooden material thereby securely fastening the entire housing 180 in place therein.

In the still modified device shown in FIGS. 15 through 17, inclusive, provision is made for retracting the floral holder with the blade 166 extending in the same direction rather than being inverted. The floral holder itself is the same as that identified by reference numeral 164 in the embodiment of FIG. 7 and has the bayonet lugs 162 on the base 170. However, the housing has been modified and is identified generally by reference numeral 196 and is a consistently cylindrical member provided with an upper flanged portion 198 which engages the outside of the casket lid 12 and which is provided with a modified form of bayonet slot 200 which is seen on one side in FIG. 17 in which comprises a vertical slot portion 202 with the upper horizontal portion 204 the same as found in FIGS. 7 through 10 but the vertical slot 202 extends to the bottom of the cylindrical member 196 and has a bottom position portion 206 thereby providing an upper and lower position for the base 170 lugs 162. The lower position is shown in FIG. 15 wherein the floral holder 164 has the lugs 162 inserted all the way to the bottom and turned into the slot portion 206. In this position, a cap member 208 with an internal recessed portion 210 that is complementary at the pointed end 168, is pressure fitted in the upper end of the cylindrical member 196 against the outer flange 198.

To extend the holder 164, the cap 208 is removed, and the blade like portion 166 is turned slightly to take it out of the slot portion 206 into the main vertical slot 202 and then is pulled straight upwardly to the position of FIG. 16 at which position it is twisted slightly to put it into the slot portion 204 thereby retaining it securely in the extended position of FIG. 16. Thus, it is a simple matter to quickly reach to remove the cap 208 and then draw the member 164 to the upward position and conversely and then reverse to turn it from its slotted portion 204 into the main slot 202 and back to the retracted position of FIG. 15 into the bottom slotted portion 206.

While I have shown and described a particular embodiment of my invention together with various alternative forms thereof, this is by illustration only and does not constitute any sort of limitation on the scope of my invention since various alterations, changes, deviations, eliminations, substitutions, ramifications, elucidations and variations may be made in the embodiments shown and described in the present specification without departing from the scope of my invention as defined in the appended claims.

I claim:
1. In a floral holder for a casket lid:
   (a) a removable cap normally closing an opening in said casket lid,
   (b) a removable floral holder member inserted and extending downwardly in said opening and being removable therefrom and invertible therein,
   (c) an attachment portion on one end of said floral holder member and an elongated floral holder shaft extending therefrom,
   (d) and, cooperating attachment means in said opening on said casket lid to receive the attachment portion of and to retain said floral holder member in place.

2. The device in claim 1 wherein said cap is mounted on said floral holder shaft and both may be removed and inverted simultaneously.

3. The device in claim 1 wherein said opening in said casket lid has a housing attached in place therein concealed beneath the lid and said housing having an elongated open space accommodating the floral holder member concealed therein.

4. The device in claim 3 wherein said housing comprises a long narrow space and a short larger space; and wherein said floral holder member has an enlarged base portion with attachment means thereon selectively and removably inserted in said housing, other cooperating attachment means in said housing engageable with said attachment means on the base portion.

5. The device in claim 3 wherein said housing is permanently pressure fitted in the opening in the casket lid.

6. The device in claim 5 wherein said housing is threaded and has a top flange thereon positioned on the outside of the casket lid, a flexible washer between the lid and flange, a pressure nut on said housing on the bottom of the lid, and a flexible washer between the bottom of the lid and the nut, all to provide a tight seat between the housing and the lid.

7. The device in claim 4 wherein said attachment means on the base is a bayonet fitting comprising lugs on the base, and the attachment means in the housing is a channel into which the lug fits, said channel having an upper track for floral holder extension position and a lower track for retracted position.

8. The device in claim 5 wherein said housing has ridges thereon with tapered edges, said diameter of the top of the edge being greater than the diameter of the opening in the lid, said housing being thereby jammed into the lid material to hold the housing in place.

9. The device in claim 8 wherein said cap has flexible means thereon engageable with the housing and flexibly retained thereon to hold said cap in place and to facilitate the removal and replacement thereof.

10. The device in claim 9 wherein said housing has a flanged portion over the top of the casket lid and an inner flanged portion extending inwardly toward the opening therein, said cap flexible means being protruding members engaging said inner flange, the end of said floral holder base being threaded, and said housing being threaded therein to removably receive said holder.

11. In a floral holder for a casket lid:
   (a) a removable cap normally closing an opening in said casket lid, which opening extends beneath the lid and concealed therein,
   (b) a removable floral holder member attached to said cap extending downwardly from said opening and being removable therefrom and invertible therein,
   (c) an attachment portion on said floral holder member, and a cooperating means on the casket lid at the opening therein,
   (d) said detachment means on said floral holder member being engageable with said casket lid means to retain said floral holder member in place in one position extending upwardly from the lid to hold flowers therein, and said cap being replaceable in the opening in the lid to conceal the holder and close the opening.

12. The device in claim 11 wherein the floral holder is screw threaded to match with screw threads on said casket lid in said opening.

13. In a floral holder for a casket lid:
   (a) a removable cap normally closing an opening in said casket lid,
   (b) a removable floral holder member extending downwardly from said opening and being removable therefrom and invertible therein to extend and hold flowers on the casket.
   (c) a bayonet fitting comprising lugs on one end of said floral holder member and an elongated floral holder shaft extending therefrom,
   (d) grooves on said casket lid to retain said floral holder member in place and to receive the lugs of the bayonet fitting, said grooves extending in one direction and having at least two other grooves extending therefrom to locate the floral holder in either extended or retracted position.

14. The device in claim 13 wherein there is a closed housing in said casket lid mounted in the opening, and said housing is attached on said lid by a pressure seal comprising a threaded portion on the housing, a nut, and gasket seal means.

15. In a floral holder for a casket lid:
   (a) a removable cap normally closing an opening in said casket lid,
   (b) a removable floral holder member extending downwardly from said opening and being removable therefrom and invertible therein,
   (c) an attachment portion one end of said floral holder member and an elongated floral holder shaft extending therefrom,
   (d) a closed housing in said lid receiving said floral holder therein,
   (e) said housing having an upper enlarged and recessed portion receiving the attachment portion of the holder, and a smaller portion receiving the holder shaft therein.

16. In a floral holder for a casket lid:
   (a) a removable cap normally closing an opening in said casket lid,
   (b) a removable floral holder member extending downwardly from said opening and being removable therefrom and invertible therein,
   (c) an attachment portion on one end of said floral holder member and an enlarged floral holder shaft extending therefrom, said attachment being one part of a two-part attachment,
   (d) a housing in said opening having a sealed attachment in said opening, said housing having the other part of a two-part connection therein for attaching the holder therein.

References Cited
UNITED STATES PATENTS

| | | | |
|---|---|---|---|
| 1,924,149 | 8/1933 | Britton | 47—41.1 |
| 2,754,625 | 7/1956 | Rasmussen | 47—41.1 |

ROY D. FRAZIER, *Primary Examiner.*

F. DOMOTOR, *Assistant Examiner.*